(12) United States Patent
Hite

(10) Patent No.: US 9,593,790 B2
(45) Date of Patent: Mar. 14, 2017

(54) CLIP FOR SECURING VALVE TO APPLIANCE AND ASSOCIATED METHOD

(71) Applicants: BSH Home Appliances Corporation, Irvine, CA (US); BSH Hausgeräte GmbH, Munich (DE)

(72) Inventor: David Hite, New Bern, NC (US)

(73) Assignees: BSH Hausgeräte GmbH, Munich (DE); BSH Home Appliances Corporation, Irvine, CA (US)

(*) Notice: Subject to any disclaimer, the term of this patent is extended or adjusted under 35 U.S.C. 154(b) by 5 days.

(21) Appl. No.: 14/656,748

(22) Filed: Mar. 13, 2015

(65) Prior Publication Data
US 2016/0265703 A1   Sep. 15, 2016

(51) Int. Cl.
| | |
|---|---|
| *F16L 37/12* | (2006.01) |
| *F16L 29/00* | (2006.01) |
| *F16L 37/38* | (2006.01) |
| *D06F 39/08* | (2006.01) |
| *F25D 3/00* | (2006.01) |
| *A47L 15/42* | (2006.01) |
| *F25D 3/12* | (2006.01) |
| *F25D 23/00* | (2006.01) |
| *F25D 23/12* | (2006.01) |

(52) U.S. Cl.
CPC .......... *F16L 37/12* (2013.01); *A47L 15/4217* (2013.01); *D06F 39/088* (2013.01); *F16L 29/007* (2013.01); *F16L 37/38* (2013.01); *F25D 23/006* (2013.01); *F25D 23/126* (2013.01)

(58) Field of Classification Search
CPC .......... F16L 37/12; F16L 29/007; F16L 37/38; F16L 3/04; F16L 3/02; F16L 3/08; F16L 3/1211; A47L 15/4217; F25D 23/006; D06F 39/088
See application file for complete search history.

(56) References Cited

U.S. PATENT DOCUMENTS

| | | | |
|---|---|---|---|
| 2,534,690 A | 12/1950 | Young, Jr. et al. | |
| 4,152,844 A | 5/1979 | Materniak et al. | |
| 4,601,448 A | 7/1986 | Miyazaki et al. | |
| 4,860,791 A | 8/1989 | Putnam | |
| 5,582,199 A | 12/1996 | Schmidt et al. | |
| 5,820,168 A | 10/1998 | De Giacomoni | |
| 6,318,765 B1 | 11/2001 | Slais et al. | |
| 6,454,311 B1 | 9/2002 | Berry | |
| 6,682,100 B2 | 1/2004 | Wood et al. | |
| 7,611,317 B2 * | 11/2009 | Muderlak | A47K 5/1217 222/333 |
| 7,930,800 B1 | 4/2011 | Castrale et al. | |

(Continued)

FOREIGN PATENT DOCUMENTS

| | | |
|---|---|---|
| DE | 8031452 U1 | 3/1981 |
| DE | 8529264 U1 | 3/1986 |

*Primary Examiner* — Kevin Murphy
*Assistant Examiner* — Patrick Williams
(74) *Attorney, Agent, or Firm* — Michael E. Tschupp; Andre Pallapies

(57) ABSTRACT

An appliance for treatment of items may include: a body defining a chamber to hold the items during treatment; a door to close the chamber during treatment; a base having an opening at an edge of the base, the body being supported on the base; a valve located in the opening; and a clip attached to the base at the opening such that the valve is secured in the opening between the clip and the base.

28 Claims, 8 Drawing Sheets

(56) References Cited

U.S. PATENT DOCUMENTS

| | | |
|---|---|---|
| 8,151,821 B2 | 4/2012 | Ball |
| 8,281,800 B2 * | 10/2012 | Ball .................. E03C 1/042 137/359 |
| 8,459,064 B2 | 6/2013 | Haltmayer et al. |
| 8,727,287 B2 | 5/2014 | Trouve et al. |
| 2012/0255330 A1 | 10/2012 | Wanweerakul |
| 2014/0062079 A1 | 3/2014 | Kesler et al. |
| 2014/0174569 A1 | 6/2014 | Burkhard et al. |

* cited by examiner

CLIP FOR SECURING VALVE TO APPLIANCE AND ASSOCIATED METHOD

FIELD OF TECHNOLOGY

The present technology relates to appliances, including domestic appliances. The present technology further relates to water-bearing appliances, e.g., dishwashers, washers, refrigerators with an ice maker and/or a water dispenser, etc. The present technology further relates to a clip that may be used to secure a water inlet valve to a base of the appliance.

BACKGROUND OF TECHNOLOGY

Typically, water-bearing, domestic appliances require a connection to an external source of water in the home. Accordingly, a water inlet valve may be attached to the appliance at a base region or on a frame. The attachment of the water inlet valve must be sufficiently secure to prevent rattling of the water inlet valve and any other structured associated with the water inlet valve's attachment. For example, the valve may be external to a treatment chamber of the appliance where there is less sound insulation and the flow of water through the valve may cause it to vibrate and generate noise if it is not secured tightly. Moreover, the valve must be held sufficiently securely to the appliance such that it does not come loose from the appliance once the appliance is installed, e.g., during use.

To secure the water inlet valve to the base of the appliance, prior art technologies have sought to securely attach the water inlet valve to the base, albeit with deficiencies. One prior art technology (see, e.g., FIG. 2) involves attaching the water inlet valve to a plate with screws or other fasteners and the plate is, in turn, attached to the base of the appliance with more screws or other fasteners. This technology is flawed in that assembly requires numerous tools to attach all of the screws or other fasteners, the screws or other fasteners add further costs, and the assembly requires a great deal of time because of the need to attach several screws or other fasteners Another prior art technology (see, e.g., FIGS. 3 and 4) involves attaching the water inlet valve to a flat plate, which is in turn attached to the base of the appliance, but without the use of any screws or other fasteners. A similar prior art technology (see, e.g., FIGS. 5 and 6), which is disclosed in U.S. Patent Application Publication No. 20140174569 and German Patent Application Publication No. DE 10 2012 224 303, involves the attachment of the water inlet valve to an angled plate, which is in turn connected to the base, without the use of any screws or other fasteners. These technologies are deficient in that assembly is difficult and the base must be produced with a large opening to accommodate either the flat plate or the angled plate.

BRIEF SUMMARY OF TECHNOLOGY

The present technology seeks to overcome the deficiencies of prior art technologies by providing a secure attachment for the valve that does not require screws or other fasteners, may be assembled quickly and simply, and does not require that the components have shapes that are complicated and/or difficult to produce.

An aspect of the present technology is directed to a clip to secure a connecting device, e.g., a valve, to a frame or a base of an appliance, such that the connecting device is positioned between the clip and the frame or the base to secure the valve in an opening of the frame or the base. The clip may have a convex portion or a protrusion that can be deformed by contact with the connecting device to maintain a constant force on the connecting device. The valve may be attached to the base by the clip without screws or other fasteners.

Another aspect of the present technology is directed to an appliance having an opening to receive a connecting device, e.g., wherein a clip secures the connecting device to the appliance. The connecting device may be positioned between the clip and a receiving portion of the appliance, e.g., a frame or a base, to secure the connecting device. The valve may be attached to the base by the clip without screws or other fasteners.

Another aspect of the present technology is directed to an appliance for treatment of items. The appliance may comprise: a body defining a chamber to hold the items during treatment; a door to close the chamber during treatment; a base having an opening at an edge of the base, the body being supported on the base; a valve located in the opening and in contact with the base; and a clip attached to the base by the clip at the opening such that the valve is secured in the opening between the clip and the base.

In examples, (a) the clip may comprise a convex portion extending from a central body of the clip, (b) the convex portion may comprise an outer edge, said outer edge being arcuate, (c) the central body of the clip may comprise a gap positioned proximal to the outer edge of the convex portion, (d) the gap may be arcuate, (e) the convex portion may be deformed by contact with the valve when the clip is attached to the base at the opening, (f) the base may comprise a base edge at the opening, and the clip may comprise a first aligning feature, a second aligning feature, and a space defined, at least in part by, the first aligning feature and the second aligning feature, the base edge being received in the space to align the clip with the base in the opening, (g) the base may comprise an aperture, and the clip may comprise a side portion having a base attachment feature structured to releasably engage with the aperture to secure the clip to the base, (h) the base attachment feature may be a cantilever tab, (i) the appliance may be a water-bearing, domestic appliance, (j) the water-bearing, domestic appliance may be a dishwasher, a washer, or a refrigerator, and/or (k) the valve is a water inlet valve or a water outlet valve.

Another aspect of the present technology is directed to a clip to secure a valve in an opening in a base of an appliance. The clip may comprise: a central body; at least one side portion extending from the central body, said at least one side portion being configured to connect with the base; and a portion extending from the central body, said portion being deformable by contact with the valve when the clip is attached to the appliance.

In examples, (a) the convex portion may comprise an outer edge, (b) the outer edge may be arcuate, (c) the central body of the clip may comprise a gap positioned proximal to the outer edge of the convex portion, (d) the gap may be arcuate, (e) the clip may comprise a first aligning feature, a second aligning feature, and a space defined, at least in part by the first aligning feature and the second aligning feature, and the space may be structured to receive an edge of the base to align the clip in the opening, (f) the at least one side portion may have a base attachment feature structured to releasably engage with an aperture of the base to secure the clip to the base, (g) the base attachment feature may be a cantilever tab, and/or (h) the portion may be a convex portion.

Another aspect of the present technology is directed to a method of securing a valve to a base on an appliance. The method may comprise: positioning the valve directly on the base; and securing the valve into position on the base with a clip that separately attaches to the base.

In examples, (a) the clip may comprise a portion extending from the clip to secure the valve in position on the base, and securing the valve into position on the base may comprise deforming the portion by contact with the valve to secure the valve between the clip and the base, (b) the portion may be a convex portion, (c) the convex portion may comprise an outer edge, said outer edge being arcuate, (d) the clip may comprise a gap positioned on a central body of the clip proximal to the outer edge of the convex portion, and the gap may be arcuate, (e) securing the valve into position on the base with the clip may comprise aligning an edge of the base at the opening in a space defined, at least in part by, a first aligning feature of the clip and a second aligning feature of the clip, and/or (f) securing the valve into position on the base with the clip may comprise engaging a base attachment feature of the clip with an aperture of the base to attach the clip to the base.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

DETAILED DESCRIPTION OF TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilized to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously. It is therefore to be understood that numerous modifications may be made to the illustrative examples and that other arrangements may be devised without departing from the spirit and scope of the technology.

Figure 1:
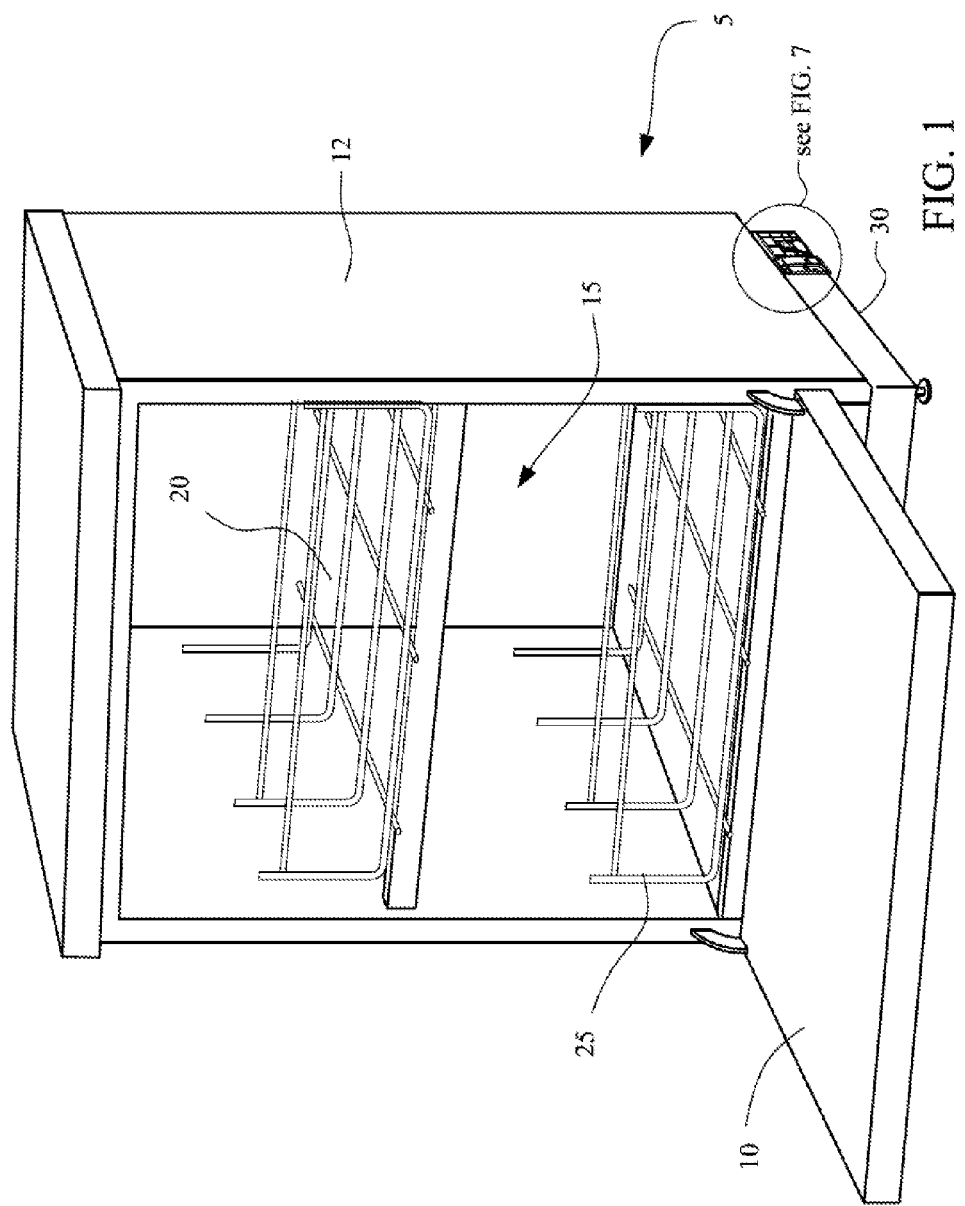
FIG. 1 is a front perspective view of an appliance, e.g., a dishwasher, according to an example of the present technology.

FIG. 1 shows an appliance 5 according to an example of the present technology. In further examples the appliance 5 may be a domestic appliance and/or a water-bearing appliance. In further examples, the appliance may be a dishwasher, a washer, or a refrigerator with an ice maker and/or a water dispenser.

The appliance 5 shown in FIG. 1 may include a body 12 that defines a chamber 15 to contain items during treatment by the appliance 5. The appliance 5 may also include a door 10 to close the chamber 15 during treatment of the items by the appliance. The appliance 5 may also include an upper rack 20 and a lower rack 25 to support the items being treated by the appliance 5. The appliance 5 may also include a base 30 that supports the body 12. Additionally or alternatively, the appliance may also include a frame (not shown) to support the body 12.

To provide water to the appliance for treatment of the items, a valve may be attached to the appliance to connect the internal fluid passages of the appliance to an external source of water. The attachment of the valve must be sufficiently tight to prevent vibration from the appliance from causing the valve to rattle or produce vibration noise. Also, the attachment of the valve must sufficiently secure to withstand the connection and disconnection of the valve from the external source of water by the user. Before describing the present technology, several prior art technologies, which have been developed in attempt to provide a solution, are discussed below along with their respective deficiencies.

Figure 2:
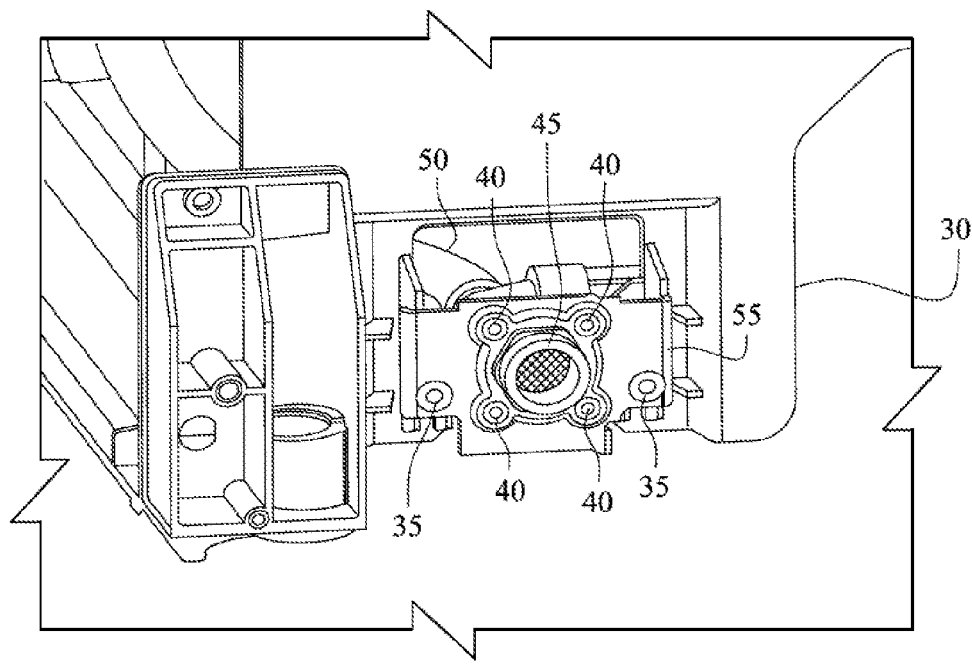
FIG. 2 is a detailed view of a base of an appliance with a water inlet valve attached with a plate and screws according to a prior art.

FIG. 2 depicts a prior art technology that includes screws. The base 30 of the appliance can be seen in detailed view. A valve 45 is shown attached to a valve plate 55 by valve screws 40. The valve plate 55 is in turn attached to the base 30 with plate screws 35. Additionally, a hose 50 can be seen passing from the valve 45 to the interior of the appliance. This prior art technology is deficient because the screws 35, 40 add significant cost to the assembly of the appliance. Furthermore, the screws 35, 40 add complexity to the appliance because there are more components. Additionally, the screws 35, 40 add complexity to the assembly of the appliance because the screws 35, 40 must be screwed in. Also, the screws 35, 40 add complexity to the assembly of the appliance because tools are required to attach the screws.

Figure 3:
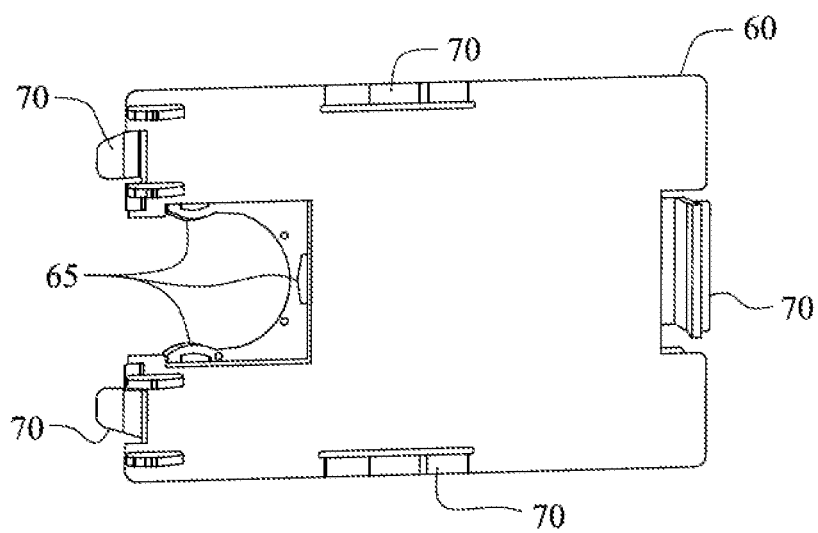
FIG. 3 is a perspective view of a flat plate according to a prior art.
Figure 4:
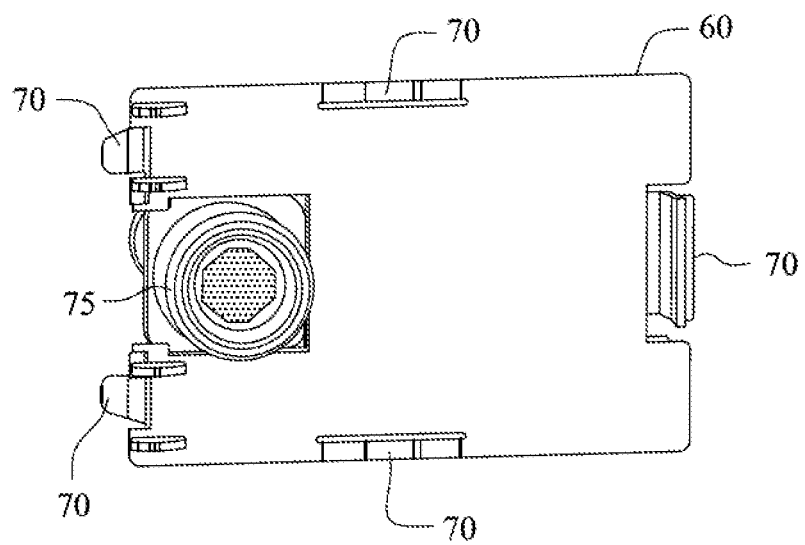
FIG. 4 is a perspective view of a flat plate with a water inlet valve according to a prior art.

Other prior art technologies sought to improve upon this technology by eliminating the need for screws. However, these technologies have deficiencies as well. FIGS. 3 and 4 depict a flat, screwless plate 60 for attaching a valve 75 to an appliance 5. The flat, screwless plate 60 includes valve tightening features 65 that, by virtue of their structure, secure the valve 75 to the flat, screwless plate 60. The flat, screwless plate 60 also includes plate tightening features 70 to secure the flat, screwless plate 60 the appliance 5, e.g., at the base 30.

Figure 5:
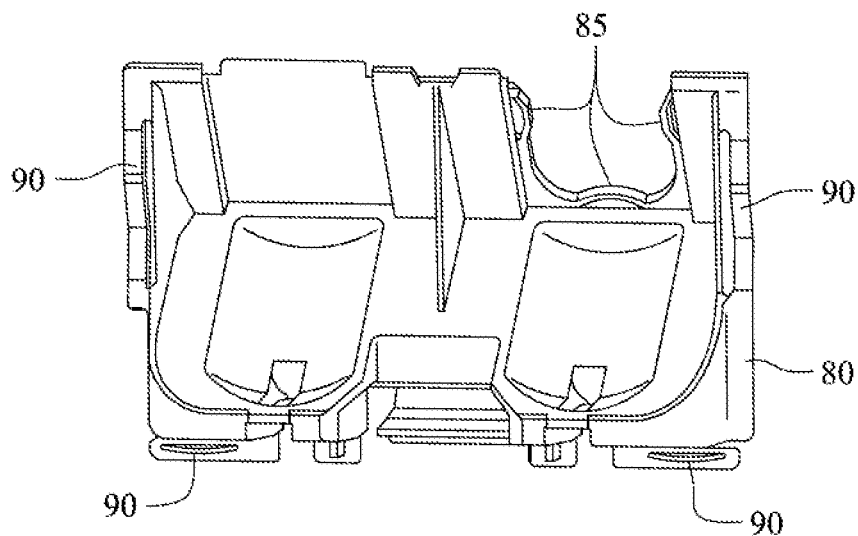
FIG. 5 is a perspective view of an angled plate according to a prior art.
Figure 6:
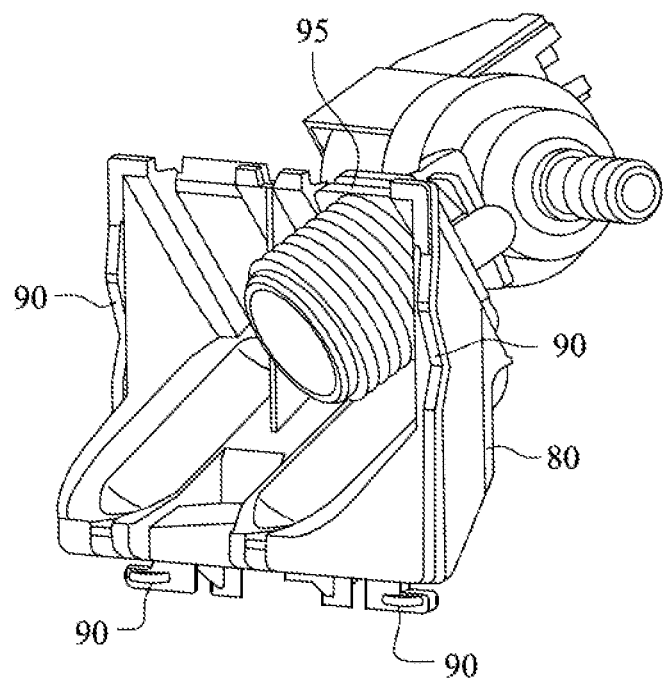
FIG. 6 is a perspective view of an angled plate with a water inlet valve according to a prior art.

FIGS. 5 and 6 depict another screwless technology. This prior art technology includes an angled, screwless plate 80, instead of the flat, screwless plate 60. Similar to the prior art technology described above, the angled, screwless plate 80 also includes valve tightening features 85 to secure a valve 95 to the angled, screwless plate 80 and plate tightening features 90 to secure the angled, screwless plate 80 to the base 30 of the appliance.

The screwless technologies described above are typically employed because the complex geometric features required for securing the valve are difficult to form on the appliance itself, e.g., the base. Moreover, these geometric features formed on the base may not be able to survive the life of the appliance. Because of these issues, the screwless plate technologies were developed to allow the valve to be attached to the plate, which is in turn attached to the base. These screwless plate technologies are deficient as well. For example, the features that attach the plate to the base require that the plate be rotated into place for attachment, which is a complex assembly step. Furthermore, the opening in the appliance that receives the plate must be large enough to accommodate the plate.

The present technology seeks to overcome the deficiencies of the prior art technologies discussed above. An example of the present technology is depicted in FIGS. 1 and 7-11. According to the depicted example of the present technology, a valve 105 may be secured to the base 30 of the appliance 5 by a clip 100. The valve 105 may be secured to the base 30 of the appliance 5 without screws or other fasteners.

Figure 7:
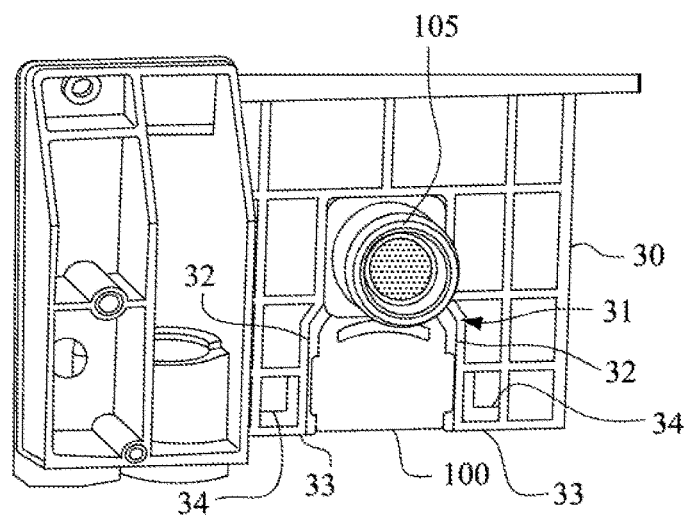
FIG. 7 is a detailed view of a base of an appliance with a valve held in place by a clip according to an example of the present technology.
Figure 8:
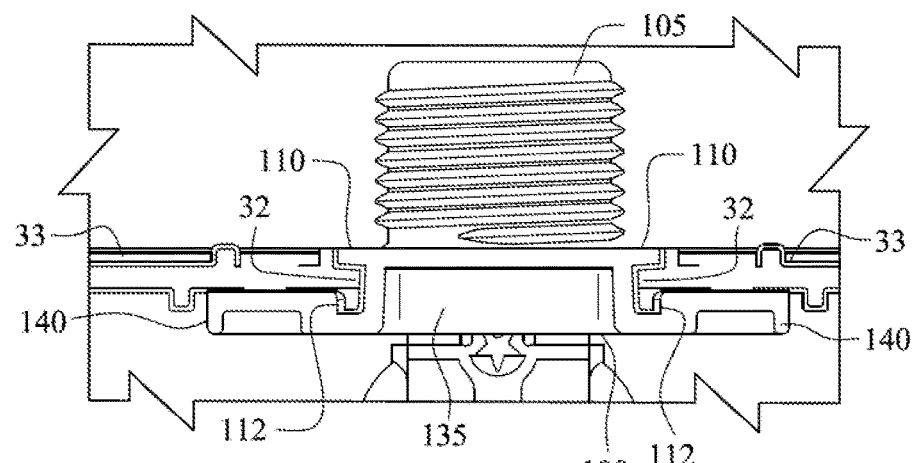
FIG. 8 is a bottom view of a base of an appliance with a valve held in place by a clip according to an example of the present technology.
Figure 9:
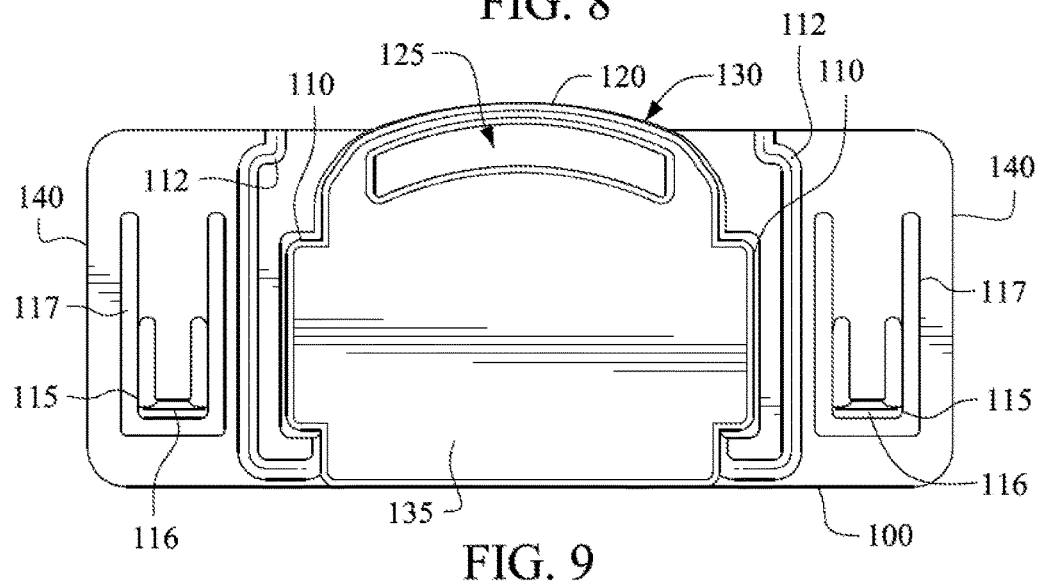
FIG. 9 is a front view of a clip according to an example of the present technology.
Figure 10:
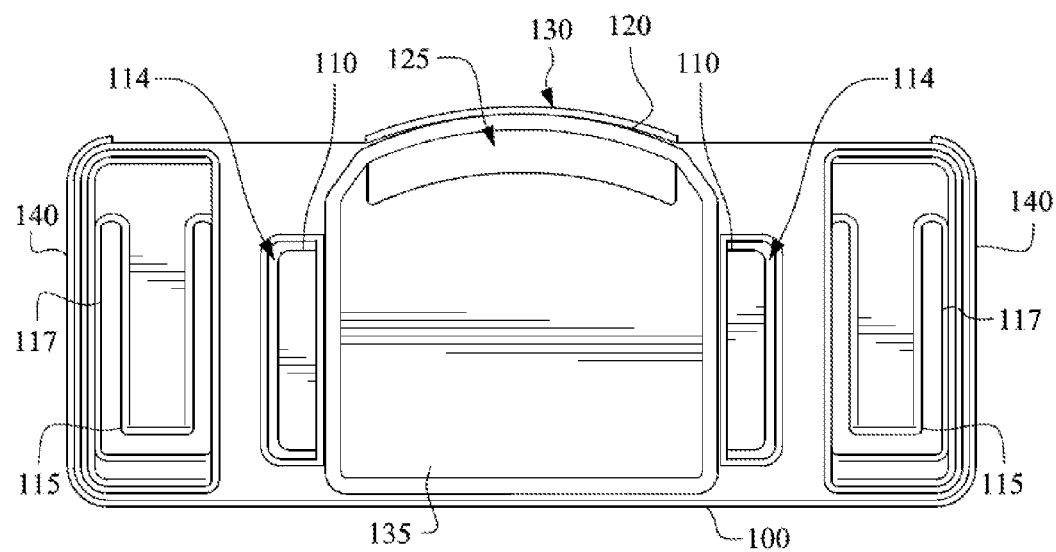
FIG. 10 is a rear view of a clip according to an example of the present technology.
Figure 11:
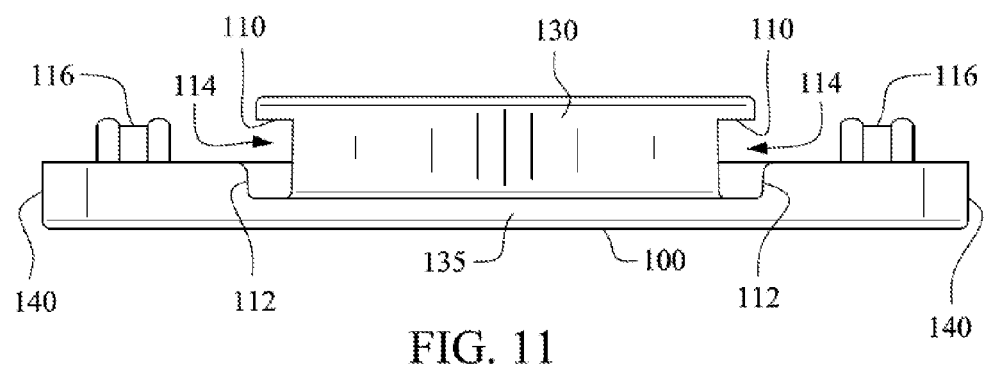
FIG. 11 is a top view of a clip according to an example of the present technology.
Figure 12:
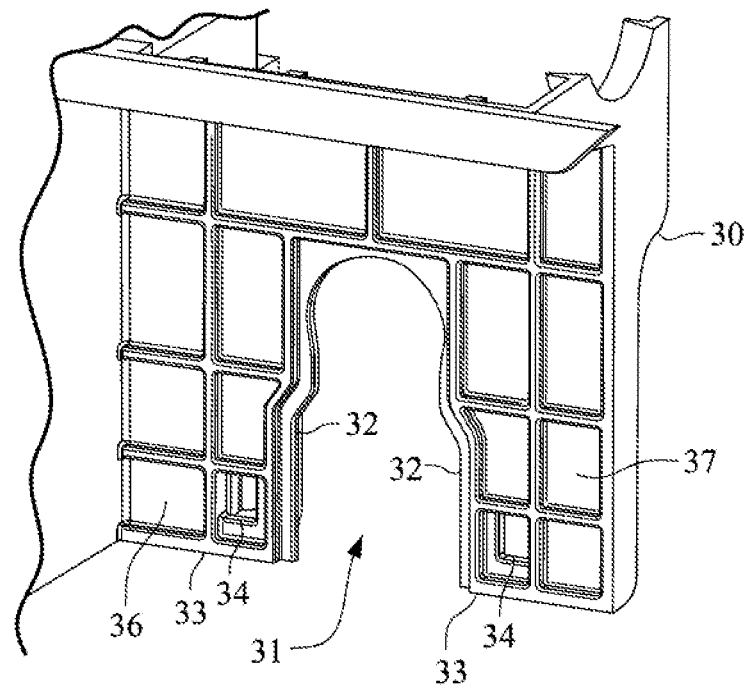
FIG. 12 is a perspective view of a base of an appliance according to an example of the present technology.

FIG. 1 shows the appliance 5 according to the present technology and indicates an exemplary location of the features depicted in greater detail in FIGS. 7-15. FIG. 1 shows this exemplary location of these features on a side of the base 30 of the appliance 5. However, it should be understood that these features could be located on a rear portion of the base 30 (not shown in this view), on the opposite side of the base 30, or on the front side of the base 30. It may be advantageous to locate the features of the present technology at a region of the base 30 that will be covered when the appliance 5 is installed, e.g., by cabinetry, walls, furniture, and/or counter(s). As shown in FIG. 7, the valve 105 is assembled to the base 30 and secured in position by the clip 100. The valve 105 may be assembled directly to or positioned directly on at least a portion of the base 30, e.g., one or more base edges 32. The valve 105 may be positioned between the clip 100 and the base 30. Furthermore, the valve 105 may be assembled directly to or in direct contact with the base 30. The base 30 may include an opening 31 defined, at least in part, by base edges 32. The opening 31 may be formed on the base 30 such that it opens at a lower edge 33 of the base 30. Once the valve 105 is inserted into the opening 31 or positioned directly on the base 30, the clip 100 may be attached to the base 30 and/or inserted into or slid into the opening 31 to secure the valve 105.

The clip 100 may include a central body 135. A portion 120 may extend from the central body 135. The portion 120 may be a convex portion. The convex portion 120 is the portion of the clip 100 that may contact the valve 105 to secure the valve 105 to the base 30 by urging the valve 105 against the base 30. The convex portion 120 may include an outer edge 130 that directly contacts the valve 105. The convex portion 120 and the outer edge 130 may be arcuate. The central body 135 may also include a gap 125 proximal to the outer edge 130. The gap 125 may also have an arcuate shape.

When the valve 105 is assembled to the base 30 and secured by the clip 100, the convex portion 120 may be deformed to provide a constant force against the valve 105 to maintain the valve 105 in position against the base 30 in the opening. Also, the convex portion 120 may be deformed such that it is pushed into the gap 125 by the valve 105, when installed. Also, the convex portion 120 may have a degree of flexibility to absorb vibration to reduce noise generated by vibration of the valve 105 and/or the clip 100 against the base 30, e.g., at edges 32 of the base 30.

Figure 15:
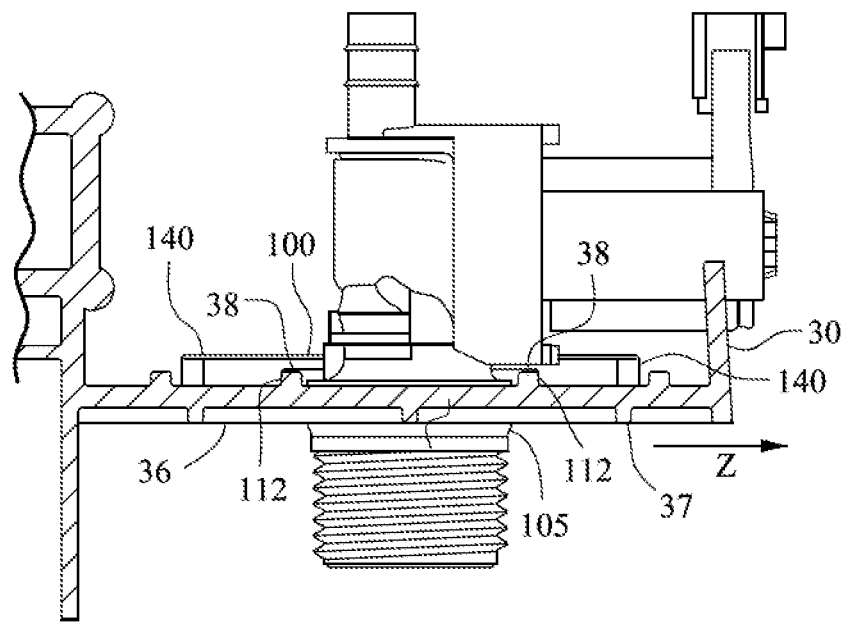
FIG. 15 is a cross-sectional view of a base of an appliance with a valve held in place by a clip taken through line 15-15 of FIG. 14 according to an example of the present technology.

As can be seen in FIGS. 8-11, the clip 100 may include at least one first aligning feature 110 and at least one second aligning feature 112. Each pair of the first aligning feature 110 and the second aligning feature 112 may define, at least in part, a space 114, which receives a corresponding base edge 32 to align the clip 100 in the opening 31 of the base 30. The first aligning feature 110 may extend from the central body 135. FIG. 15 also shows base alignment features 38 around which the first aligning feature 110 of the clip 100 and the second aligning feature 112 may be aligned to align and secure the clip 100 in the opening 31 of the base 30.

The clip 100 may also include at least one side portion 140. The side portion 140 may extend from the central body 135. The clip 100 may include two side portions 140 that extend from the central body 135 in opposite directions. The second aligning feature 112 may be extend from the side portion 140. The side portion 140 may include a base attachment feature 115 formed in a cutout 117 of the side portion 140. The base attachment feature 115 may be a cantilever tab and the base attachment feature 115 may include a protrusion 116 at its free end. When the clip 100 is attached to the base 30 at the opening 31, the protrusion 116 may extend into a corresponding aperture 34 on the base 30 to provide releasable engagement between the clip 100 and the base 30. For example, the engagement of the protrusion 116 to the aperture 34 may be accomplished with a snap-fit. Alternatively, the clip 100 may be secured to the base 30 at the opening 31 with a friction fit or a press fit.

The valve 105 may be secured to the base 30 of the appliance 5 by the following method. The valve 105 may be positioned directly on the base 30 and the valve 105 may be secured into position on the base 30 with a clip 100 that separately attaches to the base 30. The clip 100 may comprise portion 120 extending from the clip 100 to secure the valve 105 in position on the base 30. The valve 105 may be secured into position on the base 30 by deforming the portion 120 by contact with the valve 105 to secure the valve 105 between the clip 100 and the base 30. The portion 120 may be a convex portion. Securing the clip 100 may include aligning an edge 32 of the base 30 in the space 114 that is defined, at least in part, by the first aligning feature 110 of the clip 100 and the second aligning feature 112 of the clip 100. Securing the clip may also include engaging a base attachment feature 115 of the clip 100 with an aperture 34 of the base 30 to attach the clip 100 to the base 30.

The clip 100 may be formed from polypropylene, according to an example of the present technology. Polypropylene may provide sufficient flexibility to the clip 100, for example, to allow the attachment features 115 to be deflected and snap back into position when the clip 100 is secured to the base 30. Also, the flexibility provided by polypropylene would allow the portion 120 to be deformed by contact with the valve 105, as described above. According to another example of the present technology, acrylonitrile butadiene styrene (ABS) may be used for the clip 100. ABS may be advantageous if a higher degree of stiffness is desired. It should be understood that other thermoplastic polymers may also be used for the clip 100.

FIGS. 12-15 depict further exemplary features of the present technology. As discussed above, the clip 100 may be used to secure the valve 105 in the opening 31 of the base. It should also be understood that the clip 100 may provide additional structural strength and stability to the base 30.

Figure 13:
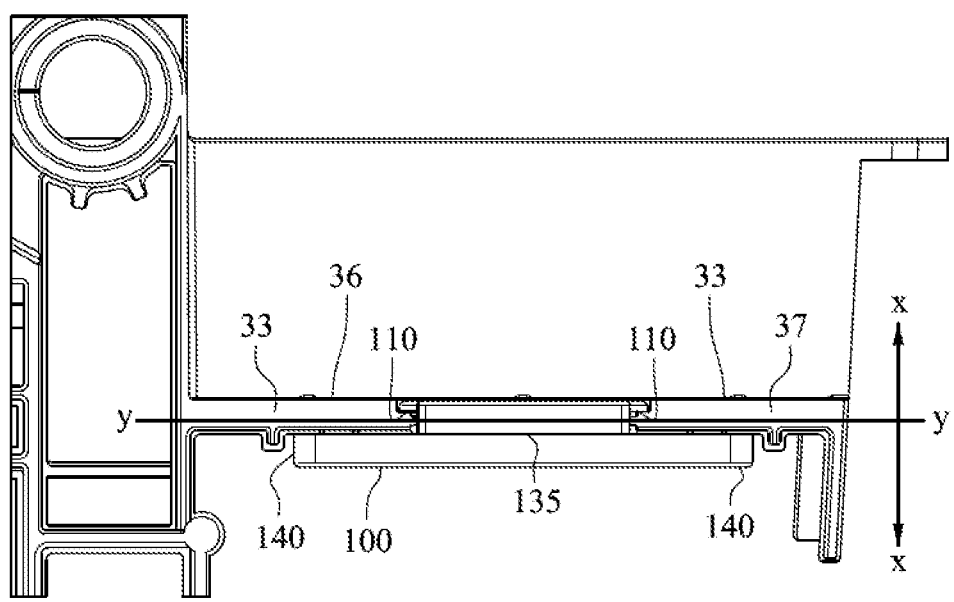
FIG. 13 is a bottom view of a base of an appliance with a clip attached thereto according to an example of the present technology.
Figure 14:
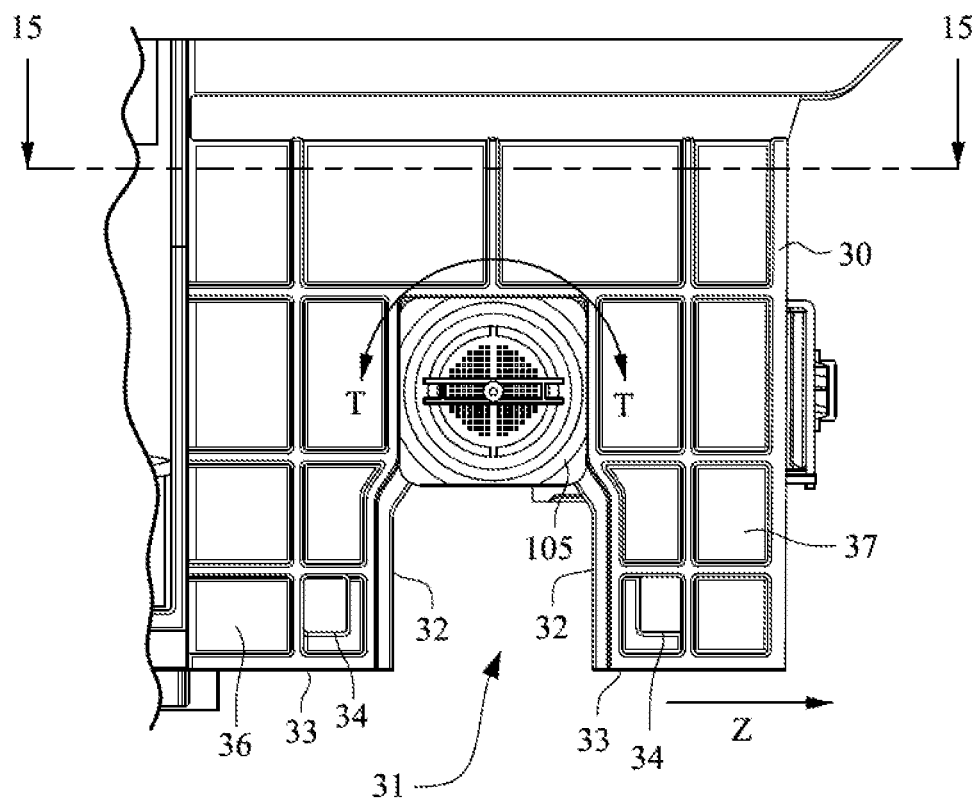
FIG. 14 is a detailed view of a base of an appliance with a valve according to an example of the present technology.

The base 30 may be divided into a supported leg 36 and an unsupported leg 37 by the opening 31. The supported leg 36 may have greater structural strength because that portion of the base 30 may be joined closely to other structural features of the appliance 5, such as the frame. The unsupported leg 37, however, can be seen extending from the base 30 at a position that may be further from structural features of the appliance 5, e.g., in a cantilever fashion. Therefore, the unsupported leg 37 may be susceptible to displacement and/or damage resulting from forces applied to the base 30. For example, the double arrow X-X shown in FIG. 13 indicates that the unsupported leg 37 may be more likely to be deflected or warped in these directions, if no additional structural support is provided. Also, the double arrow T-T shown in FIG. 14 indicates the directions of torque that may be applied to the base 30 when a user connects or disconnects a hose (not shown) to or from the valve 105, e.g., at its threaded connection. The result of the torque in the directions T-T may cause the unsupported leg 37 to tend to translate away from the base in the Z direction, as shown in FIGS. 14 and 15.

The attachment of the clip 100 to the base 30 at the opening 31, however, may add structural rigidity to the base 30, e.g., at the unsupported leg 37, by connecting the supported leg 36 and the unsupported leg 37. In other words, once the clip 100 is attached to secure the valve 105 in position in the opening 31, the unsupported leg 37 is no longer extending from the base in a cantilever fashion because its free end is joined to the supported leg 36. As can be seen in FIG. 13, for example, the first aligning feature 110 of the clip 100 and the second aligning feature 112 of the clip 100 are engaged with the supported leg 36 and the unsupported leg 37, respectively, such that the supported leg 36, the clip 100, and the unsupported leg 37 are aligned along the axis Y-Y. By aligning the supported leg 36, the clip 100, and the unsupported leg 37 along the Y-Y axis as shown, the unsupported leg 37 may be provided with additional structural support and rigidity to resist deformation in the X-X and Z directions, which could cause damage to the base 30.

The present technology is an improvement over the prior art technologies, e.g., because it does not require screws or other fasteners. Therefore, cost and complexity of assembly are reduced. Furthermore, the clip 100 of the present technology may be made smaller than the screwless plate technologies discussed above because the clip 100 does not need to have the valve 105 attached directly thereto before being installed on the base 30. Additionally, this provides a simpler, quicker installation because the valve 105 can be inserted into the opening 31 of the base 30 or positioned directly on the base 30 and the clip 100 can be attached to the base 30 or slid into or inserted into the opening 31 to secure the valve 105 against the base 30, rather than the assembler having to rotate a screwless plate into position on the base 30. Also, because the clip 100 can be made smaller than the screwless plate technologies, the appliance 5 does not need to be tipped over to remove the screwless plate for service. Rather, the base 30 may be supported sufficiently high off of the floor such that the clip 100 can be detached and the valve 105 removed while the appliance 5 remains on the floor.

The convex portion 120 also is able to securely hold the valve 105 against the opening 31 of the base 30 to minimize vibration noise that may be caused by vibration of the appliance during use. The clip 100 may also provide additional structural rigidity to the base 30 at the opening because it can hold the base edges 32 on either side of the opening 31 together and provide support for the base edges 32, for example, when the user is connecting or disconnecting the appliance from an external water source.

It should also be understood that the clip 100 of the present technology may be used to secure other connecting devices. For example, the clip 100 may be used to secure hoses or lines that transfer water or other fluids. Also, the clip 100 may be used to secure electrical connections, e.g., electrical sockets. Furthermore, the clip 100 may provide a secure connection for a valve or other component to other parts of an appliance, e.g., a frame, a body panel, a housing, etc. Additionally, it should be understood that the connection facilitated by the clip 100 may be internal to the appliance or it may be on an external surface. Also, it should be understood that more than one clip 100 may be provided to the appliance to offer multiple connections as needed by the configuration of the appliance.

The invention claimed is:

1. An appliance for treatment of items, the appliance comprising:
    a body defining a chamber to hold the items during treatment;
    a door to close the chamber during treatment;
    a base having an opening at an edge of the base, the body being supported on the base;
    a valve located in the opening and in contact with the base; and
    a clip attached to the base at the opening such that the valve is secured by the clip in the opening between the clip and the base,
    wherein the clip comprises a central body and a deformable portion, and wherein the deformable portion comprises a central portion which is spaced apart from the central body of the clip and opposite end portions connected to the central body of the clip, so as to form an enclosed gap fully within the clip.

2. The appliance of claim 1, wherein the deformable portion is a convex portion.

3. The appliance of claim 2, wherein the convex portion comprises an outer edge, said outer edge being arcuate.

4. The appliance of claim 3, wherein the enclosed gap is positioned proximal to the outer edge of the convex portion.

5. The appliance of claim 1, wherein the enclosed gap is arcuate.

6. The appliance of claim 1, wherein the deformable portion is deformed by contact with the valve when the clip is attached to the base at the opening.

7. The appliance of claim 1, wherein the base comprises a base edge at the opening, and
wherein the clip further comprises a first aligning feature, a second aligning feature, and a space defined, at least in part, by the first aligning feature and the second aligning feature, the base edge being received in the space to align the clip with the base in the opening.

8. The appliance of claim 1, wherein the base further comprises an aperture, and
wherein the clip further comprises a side portion having a base attachment feature structured to releasably engage with the aperture to secure the clip to the base.

9. The appliance of claim 8, wherein the base attachment feature is a cantilever tab.

10. The appliance of claim 1, wherein the appliance is a water-bearing, domestic appliance.

11. The appliance of claim 10, wherein the water-bearing, domestic appliance is a dishwasher, a washer, or a refrigerator.

12. The appliance of claim 1, wherein the valve is a water inlet valve or a water outlet valve.

13. A clip to secure a valve to in an opening in a base of an appliance, the clip comprising:
a central body;
at least one side portion extending from the central body, said at least one side portion being configured to connect with the base; and
a deformable portion extending from the central body, said deformable portion being deformable by contact with the valve when the clip is attached to the appliance,
wherein the deformable portion comprises a central portion which is spaced apart from the central body of the clip and opposite end portions connected to the central body of the clip, so as to form an enclosed gap fully within the clip; and wherein the valve is secured by the clip in the opening between the clip and the base.

14. The clip of claim 13, wherein the deformable portion is a convex portion.

15. The clip of claim 14, wherein the convex portion comprises an outer edge.

16. The clip of claim 15, wherein the outer edge is arcuate.

17. The clip of claim 15, wherein the enclosed gap is positioned proximal to the outer edge of the convex portion.

18. The clip of claim 13, wherein the enclosed gap is arcuate.

19. The clip of claim 13, wherein the clip further comprises a first aligning feature, a second aligning feature, and a space defined, at least in part by, the first aligning feature and the second aligning feature, and
wherein the space is structured to receive an edge of the base to align the clip in the opening.

20. The clip of claim 13, wherein the at least one side portion has a base attachment feature structured to releasably engage with an aperture of the base to secure the clip to the base.

21. The clip of claim 20, wherein the base attachment feature is a cantilever tab.

22. A method of securing a valve to a base on an appliance, the method comprising:
positioning the valve directly on the base; and
securing the valve into position on the base with a clip that separately attaches to the base,
wherein the clip comprises a central body and a deformable portion, and
wherein the deformable portion comprises a central portion which is spaced apart from the central body of the clip and opposite end portions connected to the central body of the clip, so as to form an enclosed gap fully within the clip.

23. The method of claim 22, wherein securing the valve into position on the base comprises deforming the deformable portion by contact with the valve to secure the valve between the clip and the base.

24. The method of claim 23, wherein the deformable portion is a convex portion.

25. The method of claim 24, wherein the convex portion comprises an outer edge, said outer edge being arcuate.

26. The method of claim 25, wherein the enclosed gap is positioned proximal to the outer edge of the convex portion, and
wherein the enclosed gap is arcuate.

27. The method of claim 22, wherein securing the valve into position on the base with the clip further comprises aligning an edge of the base in a space defined, at least in part by, a first aligning feature of the clip and a second aligning feature of the clip.

28. The method of claim 22, wherein securing the valve into position on the base with the clip further comprises engaging a base attachment feature of the clip with an aperture of the base to attach the clip to the base.

* * * * *